US010176049B2

(12) United States Patent
Oberhofer et al.

(10) Patent No.: US 10,176,049 B2
(45) Date of Patent: Jan. 8, 2019

(54) LOGGING PROCESS IN A DATA STORAGE SYSTEM

(71) Applicant: International Business Machines Corporation, Armonk, NY (US)

(72) Inventors: Martin Oberhofer, Bondorf (DE); Jens P. Seifert, Gaertringen (DE); Kostas Rakopoulos, Toronto (CA); Stephen Rees, Bowmanville (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 188 days.

(21) Appl. No.: 14/907,661

(22) PCT Filed: Jul. 7, 2014

(86) PCT No.: PCT/IB2014/062914
§ 371 (c)(1),
(2) Date: Jan. 26, 2016

(87) PCT Pub. No.: WO2015/015339
PCT Pub. Date: Feb. 5, 2015

(65) Prior Publication Data
US 2016/0162366 A1    Jun. 9, 2016

(30) Foreign Application Priority Data
Aug. 2, 2013 (GB) .................... 1313863.1

(51) Int. Cl.
*G06F 17/00* (2006.01)
*G06F 11/14* (2006.01)
(Continued)

(52) U.S. Cl.
CPC ........ *G06F 11/1451* (2013.01); *G06F 3/0619* (2013.01); *G06F 3/0653* (2013.01);
(Continued)

(58) Field of Classification Search
CPC .. G06F 17/30368; G06F 17/30; G06F 17/371; G06F 11/1451; G06F 17/30371
(Continued)

(56) References Cited

U.S. PATENT DOCUMENTS 5,075,201 A    12/1991   Koh
7,702,867 B2    4/2010   Coombs et al.
(Continued)

FOREIGN PATENT DOCUMENTS

CN    1014109683 A    4/2009
EP    2378410 A2    10/2011
(Continued)

OTHER PUBLICATIONS

Int. Search Report/Written Opinion cited in PCT/US2013/052333 dated Aug. 15, 2014, 15 pgs.
(Continued)

*Primary Examiner* — Isaac M Woo
(74) *Attorney, Agent, or Firm* — Cuenot, Forsythe & Kim, LLC

(57) ABSTRACT

A logging process in a data storage system having a set of storage tiers, each storage tier of the set of storage tiers having different performance characteristics, wherein the set of storage tiers is divided into a plurality of subsets of storage tiers using the performance characteristics, may include initiating the logging process for creating a separate log file for each of the plurality of subsets of storage tiers for maintaining a history of data changes in the subset of storage tiers, thereby creating a plurality of log files. In response to a change in data stored in at least one storage tier of a subset of storage tiers of the plurality of subsets of storage tiers, one or more log records including information about the change may be generated and written into respective log files.

22 Claims, 3 Drawing Sheets

(51) Int. Cl.
*G06F 3/06* (2006.01)
*G06F 17/30* (2006.01)

(52) U.S. Cl.
CPC ........ *G06F 3/0683* (2013.01); *G06F 11/1469* (2013.01); *G06F 11/1471* (2013.01); *G06F 17/30368* (2013.01); *G06F 17/30371* (2013.01); *G06F 11/1461* (2013.01); *G06F 2201/80* (2013.01)

(58) Field of Classification Search
USPC ................................................. 707/600–899
See application file for complete search history.

(56) References Cited

U.S. PATENT DOCUMENTS

| | | | |
|---|---|---|---|
| 7,831,564 | B1 | 11/2010 | Wei et al. |
| 8,255,660 | B1 | 8/2012 | Chatterjee et al. |
| 8,364,648 | B1 | 1/2013 | Sim-Tang |
| 8,429,346 | B1 | 4/2013 | Chen et al. |
| 9,846,711 | B2 * | 12/2017 | Borthakur ......... G06F 17/30312 |
| 2005/0139757 | A1 | 6/2005 | Iwanczyk et al. |
| 2009/0121146 | A1 | 5/2009 | Luhta et al. |
| 2010/0211547 | A1 | 8/2010 | Kamei et al. |
| 2011/0106862 | A1 | 5/2011 | Mamidi et al. |
| 2011/0197046 | A1 | 8/2011 | Chiu et al. |
| 2012/0133001 | A1 | 5/2012 | Tkaczyk et al. |
| 2012/0221787 | A1 | 8/2012 | Fuente et al. |
| 2012/0223241 | A1 | 9/2012 | Kim et al. |
| 2013/0054920 | A1 | 2/2013 | Sato et al. |

FOREIGN PATENT DOCUMENTS

| | | |
|---|---|---|
| JP | 2010191647 A | 9/2010 |
| WO | 2007/011779 A2 | 10/2007 |

OTHER PUBLICATIONS

WIPO Appln. No. PCT/IB2014/062914, Written Opinion of the International Search Authority, dated Dec. 9, 2014, 5 pg.
WIPO Appln. No. PCT/IB2014/062914, International Search Report, dated Dec. 9, 2014, 2 pg.
Graham, D., "CIO Challenge: Performance vs. Cost, The Data Temperature Spectrum," Teradata Corporation © 2012, White Paper EB-6599, Jun. 2012, 10 pg.
"Multi-Temperature Data Warehousing With Teradata," Teradata Corporation © 2006-2007, White Paper EB-4816, Oct. 2007, 4 pg.
UK Appln. GB1313863.1, Search Report, dated Jan. 20, 2014, 3 pg.
Sheng, Y. et al., "A High Effective Indexing and Retrieval Method Providing Block-Level Timely Recovery to Any Point-in-Time," in IEEE 5th Int'l. Conf. on Networking, Architecture, and Storage (NAS '10), pp. 41-50, 2010.
Aguilera, M.K. et al., "Improving Recoverability in Multi-tier Storage Systems," In IEEE/IFIP 37th Int'l Conf. on Dependable Systems and Networks, (DSN '07), pp. 677-686, Jun. 25-28, 2007.
"Data management using multi-temperature storage," [online] IBM Knowledge Center, DB2 10.5 for Linux, UNIX, and Windows [retrieved Jan. 26, 2016], retrieved from the Internet: <https://www-01.ibm.com/support/knowledgecenter/SSEPGG_10.5.0/com.ibm.db2.luw.admin.dbobj.doc/doc/c0059106.html>, 3 pg.
Int. Preliminary Report cited in PCT Application No. PCT/US2013/052333 dated Jan. 26, 2016, 9 pgs.
First Chinese Office Action cited in Chinese Application No. 2001380079032.9 dated Jun. 28, 2017, 12 pgs.
Second Chinese Office Action cited in Chinese Application No. 201380079032.9 dated May 11, 2018, 10 pgs.

* cited by examiner

LOGGING PROCESS IN A DATA STORAGE SYSTEM

BACKGROUND

The invention relates to computing systems and, more particularly, to a method for a logging process in a data storage system.

The temperature-based storage in commercial databases becomes one of the more important technologies for different sized companies. It is intended to reduce the storage cost. However, backup and restore functions need to be optimized for an optimal use of the temperature-based storage technique.

SUMMARY

A computer implemented method for a logging process in a data storage system including a set of storage tiers, each storage tier of the set of storage tiers having different performance characteristics, wherein the set of storage tiers is divided into a plurality of subsets of storage tiers using the performance characteristics, wherein the method may include initiating, using a processor, the logging process for creating a separate log file for each of the plurality of subsets of storage tiers for maintaining a history of data changes in the subset of storage tiers, thereby creating a plurality of log files. The method may also include, in response to a change in data stored in at least one storage tier of a subset of storage tiers of the plurality of subsets of storage tiers, generating, using the processor, one or more log records including information about the change, and writing, using the processor, the one or more log records into the respective log files.

A computer program product includes a computer readable storage medium having computer executable instructions stored thereon. The computer executable instructions are executable by a processor to perform a method for a logging process in a data storage system including a set of storage tiers, each storage tier of the set of storage tiers having different performance characteristics, wherein the set of storage tiers is divided into a plurality of subsets of storage tiers using the performance characteristics. The method may include initiating, using the processor, the logging process for creating a separate log file for each of the plurality of subsets of storage tiers for maintaining a history of data changes in the subset of storage tiers, thereby creating a plurality of log files. The method may also include, in response to a change in data stored in at least one storage tier of a subset of storage tiers of the plurality of subsets of storage tiers, generating, using the processor, one or more log records including information about the change, and writing, using the processor, the one or more log records into the respective log files.

A computer system for a logging process in a data storage system including a set of storage tiers, each storage tier of the set of storage tiers having different performance characteristics, wherein the set of storage tiers is divided into a plurality of subsets of storage tiers using the performance characteristics, wherein the computer system includes a processor, and memory configured to store a plurality of applications that are executable on the processor, wherein a logging application of the applications includes instructions that, when executed cause the processor to perform a method. The method may include initiating the logging process for creating a separate log file for each of the plurality of subsets of storage tiers for maintaining a history of data changes in the subset of storage tiers, thereby creating a plurality of log files. The method may also include, in response to a change in data stored in at least one storage tier of a subset of storage tiers of the plurality of subsets of storage tiers, generating one or more log records including information about the change, and writing the one or more log records into the respective log files.

BRIEF DESCRIPTION OF THE DRAWINGS

In the following, preferred embodiments of the invention will be described in greater detail by way of example only making reference to the drawings in which.

DETAILED DESCRIPTION

Figure 1:
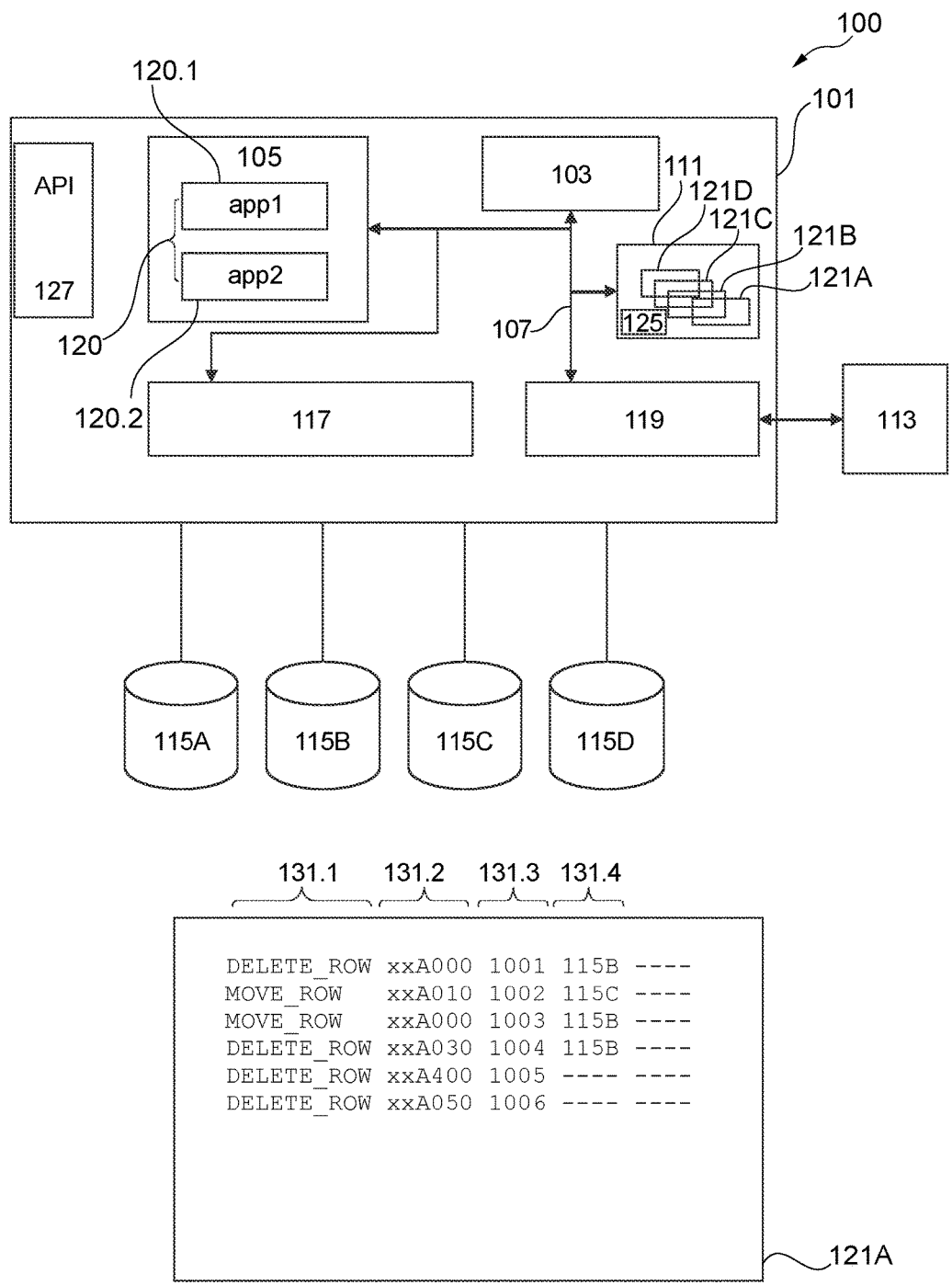
FIG. 1 depicts an exemplary system architecture for a logging process.

It is an objective of embodiments of the invention to provide for an improved computer-implemented method, a computer system and a computer program product. Said objective is solved by the subject matter of the independent claims. Advantageous embodiments are described in the dependent claims.

The term "table space" as used herein refers to an area of persistent physical database storage within which tables, indexes or other database objects are stored.

The term "storage path" as used herein refers to an area of persistent physical storage available from the operating environment, within which table spaces are created.

The term "storage group" as used herein refers to a named set of storage paths. A storage group can contain multiple table spaces, but a table space is in exactly one storage group.

The term "storage tier" as used herein refers to a collection of one or more storage groups with similar characteristics. A storage group can be in exactly one storage tier.

In one aspect, the invention relates to a computer implemented method for a logging process in a data storage system comprising a set of storage tiers, each storage tier of the set of storage tiers having different performance characteristics, wherein the set of storage tiers is divided into a plurality of subsets of storage tiers using the performance characteristics.

The method may comprise: initiating the logging process for creating a separate log file for each of the plurality of subsets of storage tiers for maintaining a history of data changes in the subset of storage tiers, thereby creating a plurality of log files; in response to a change in data stored in at least one storage tier of a subset of storage tiers of the plurality of subsets of storage tiers, generating one or more log records comprising information about the change, and writing the one or more log records into the respective log files.

These features may be advantageous as they may allow a point in time recovery per subset of storage tiers. During recovery of a storage tier only the log file corresponding to said storage tier may be used. This may speed up the recovery by reading only required log files having smaller size than a single log file. This is in contrast to the conventional methods that apply a recovery of the whole subsets of storage tiers using a single log file.

Also, a localized backup depending on the performance characteristics of the subsets of storage tiers may be performed. For example, the subset of storage tier having highest frequency of access and changes may be backed up independent and more frequently than the other subsets of storage tiers. This may prevent a high I/O penalty due to reading all data on the other tiers to determine if something changed that must be included in the backup as in currently existing solutions.

Another advantage may be that the log files may be stored and accessed depending on their frequency of usage. For example, there is no need to keep all log files online even if newer backups for part of the database are available, because they are independent.

These features may allow usage of different backup techniques as well as different design implementations across storage tiers. For example, costly storage systems with split mirror capabilities may be used for a subset of storage tiers having highest performance characteristics. This may reduce the cost, with the ability to include split mirror techniques in a cost-effective way into the solution, specifically for cloud-based exploitation of relational databases systems.

According to one embodiment, each log file of the plurality of log files comprises a logical address of the respective subset of storage tiers. The method may further comprise creating a mapping between the plurality of log files and the plurality of subsets of storages tiers, wherein said mapping indicates for each log file of the plurality of log files the respective subset of storage tiers; invoking an application programming interface, API, with the created mapping to restore to a given time data content of a failed subset of storage tiers using the log file of the failed subset of storage tiers.

This may be advantageous as it may avoid assignment of wrong log files to the storage tiers. The provision of an API may expose the novel structure of log files and corresponding storage tiers using the mapping. This may allow a seamless and transparent implementation of the method in existing systems.

According to one embodiment, the method may further comprise assigning a log sequence number, LSN, to the plurality of subsets of storage tiers, wherein each log record of the plurality of log files comprises a uniquely increased value of the LSN.

The usage of a consistent numbering for the records across the plurality of subsets of storage tiers may simplify the restoration of multiple storage tiers associated with different log files. For example, a logical, global numbering schema may be used for the transactions so that each transaction, independent from where its recorded, is uniquely identifiable within a global numbering schema across all (transactional) log files.

According to one embodiment, in case the change in data stored in the at least one storage tier is caused by an operation that changes data stored in other storage tiers of the set of storage tiers, generating the one or more log records such that the information about the change is indicative of a record linkage of the at least one storage tier to the other storage tiers.

For example, a transaction may cause changes in data of a first storage tier of a first subset of storage tiers, and may also cause changes in data of a second storage tier of a second subset of storage tiers. When generating a log record that is written in the log file of the first subset of storage tiers, a record linkage may be added in the information of the log record. The record linkage may indicate the second storage tier, such that when restoring the first subset of storage tiers at a given time point that is more recent than the time at which said log record has been generated the second subset of storage tiers may also be restored. The record linkage may further indicate the location of the log file of the second subset of storage tiers.

If the restore target point s after the occurrence of the transaction which touched a desired tier plus an incidental tier, then in order to have consistent transactions a restore and roll forward of log records on both the desired and incidental tiers may be required. If the restore target is prior to the first transaction affecting both the desired and any incidental tiers, then only the desired tier needs to be restored.

According to one embodiment, in response to a restore request for restoring data content of a given subset of storage tiers of the plurality of subsets of storage tiers at a target point in time, using record linkages up to the target point in time in the log file of the given subset of storage tiers, to identify other subsets of storage tiers of the plurality of storage tiers to be restored, restoring data content of the given storage tier and the identified subsets of storage tiers to the target point in time based on the log records of the respective log files and the LSN.

For example, the restore request may be triggered by a detection of a failure in at least one storage tier of the given subset of the storage tiers.

According to one embodiment, the method further comprises responding to a failure in the storage system, concurrently restoring data content in each of the plurality of subsets of storage tiers to a given time based on the log records of the plurality of log files and the global LSN. The global LSN is representing the given time.

Running concurrent restore operations on respective log files may speed up the restore operation of the storage system compared to conventional methods.

According to one embodiment, the method may further comprise recovering from a failure in a first and second subset of storage tiers of the plurality of subsets of storage tiers by restoring the first and second subset of storage tiers at a given time using the respective log file and LSN.

The restoring of the first and second subsets of storages may be performed concurrently.

According to one embodiment, the method may further comprise performing a full backup of the storage system content by: performing a full backup in each of the plurality of subsets of the storage tiers, and recording a log entry indicative of the full backup in the respective log file.

For example, a full backup command on the storage system is translated to a full backup per subset of storage tiers. The full backups may be performed concurrently using respective log files.

According to one embodiment, the performance characteristics may comprise one of an I/O response time, I/O throughput and a combination thereof, wherein dividing of the set of storage tiers comprises ordering said storage tiers in accordance with at least one performance characteristic, defining a plurality of range constraints on the at least one performance characteristic, and selecting storage tiers from the set of the storage tiers satisfying the plurality of range constraints, for determining the plurality of subsets of storage tiers.

The performance characteristic may comprise error rates.

The performance characteristic may comprise a communication rate.

The performance characteristic may comprise power consumption.

The performance characteristic may comprise delay time.

The performance characteristic may comprise capacity to handle data access requests.

For example, a range constraint may be determined as an interval of I/O response times having a lower and an upper limit for the I/O response time. One or more storage tiers may have I/O response time values that belong to the same interval.

According to one embodiment, each subset of storage tiers of the plurality of subsets of storage tiers may comprise a single storage tier.

For example, each storage tier of the set of storage tiers is associated with a log file.

According to one embodiment, the method may further comprise determining for a subset of the plurality of subsets of storage tiers the minimum LSN associated with the log records written in the log file of the subset of storage tier.

The minimum LSN may be the LSN of an oldest uncommitted transaction, or an oldest unflushed dirty page.

The minimum LSN may be introduced per subset of storage tiers to assure that the backup/restore may seamlessly operate per storage tier with no dependency on other storage tiers.

This embodiment may allow a forward recovery per storage tier using the log records associated with an uncommitted transaction. The log records are written in the log file of said storage tier.

In another aspect, the invention relates to a computer program product comprising computer executable instructions to perform the method steps of the method of any one of the preceding embodiments.

In another aspect, the invention relates to a computer system for an improved logging process in a data storage system comprising a set of storage tiers, each storage tier of the set of storage tiers having different performance characteristics, wherein the set of storage tiers is divided into a plurality of subsets of storage tiers using the performance characteristics, the computer system being connected to the data storage system, the computer system comprising a processor, and memory configured to store a plurality of applications that are executable on the at least one processor, wherein a logging application of the applications includes instructions that, when executed cause the processor to:

initiate the logging process for creating a separate log file for each of the plurality of subsets of storage tiers for maintaining a history of data changes in the subset of storage tiers, thereby creating a plurality of log files;

in response to a change in data stored in at least one storage tier of a subset of storage tiers of the plurality of subsets of storage tiers, generate one or more log records comprising information about the change, and writing the one or more log records into the respective log files.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

It is understood that one or more of the aforementioned embodiments may be combined as long as the combined embodiments are not mutually exclusive.

In the following, like numbered elements in the figures either designate similar elements or designate elements that perform an equivalent function. Elements which have been discussed previously will not necessarily be discussed in later figures if the function is equivalent.

FIG. 1 depicts an exemplary system architecture 100 for a logging process. The system architecture 100 provides a computer system 101. The components of computer system 101 may include, but are not limited to, one or more processors or processing units 103, a storage system 111, a memory system 105, and a bus 107 that couples various system components including memory system 105 to processor 103.

Computer system 101 typically includes a variety of computer system readable media. Such media may be any available media that is accessible by computer system 101, and it includes both volatile and non-volatile media, removable and non-removable media.

Computer system 101 may also communicate with one or more external devices such as a keyboard, a pointing device, a display 113, etc.; one or more devices that enable a user to interact with computer system 101; and/or any devices (e.g., network card, modem, etc.) that enable computer system 101 to communicate with one or more other computing devices. Such communication can occur via I/O interface(s) 119. Still yet, computer system 101 can communicate with one or more networks such as a local area network (LAN), a general wide area network (WAN), and/or a public network (e.g., the Internet) via network adapter 117. As depicted, network adapter 117 communicates with the other components of computer system 101 via bus 107.

Memory system 105 may include computer system readable media in the form of volatile memory, such as random access memory (RAM) and/or cache memory. Memory system 105 is configured to store a plurality of applications that are executable on the processor 103. For example, the memory system 105 may comprise an operating system as well as other application programs 120.

The computer system 101 may act as a storage controller connected to one or more storage tiers 115A-115D storing at least in part a relational database. The storage tiers 115A-115D may be included in a parallel network and coordinated by a network protocol.

The storage tiers 115A-115D have different performance characteristics. The performance characteristics may be for example I/O response time and/or I/O throughput and/or a combination thereof. The storage tiers 115A-115D may be ranked or classified based on their performance characteristics. For example, the storage tier 115A may have the lowest I/O response time and may be referred to as a super-hot storage tier (the "temperature" is used as a metaphor for frequency of access). The storage tier 115A may be realized with SSD storage with split mirror functions to write backups. Storage tier 115B may have the second lowest I/O response time and may be referred to as a hot storage tier which may be realized with very fast DS8300 storage with split mirror functions to write backups. Storage tier 115C may have the third lowest I/O response time and may be referred to as a medium performing tier. This storage tier 115C may be realized with normal hard disk storage where backups are taken with usual I/O-based operations. Storage tier 115D may have the highest I/O response time and may be referred to as a cold tier, which may be realized with slower hard disk storage where backups are taken with usual I/O-based operations. The data contained in the base tables in the storage tiers 115A-115D is retrievable by means of a query to the computer system 101.

The computer system 101 and storage tiers 115 may be implemented in separate machines, or may be implemented as separate processes in a single machine. Though four storage tiers are shown, any number of storage tiers may be used. Also, more than one storage tier may be part of a performance category or range. For example, both storage tiers 115A and 115B may be hot tiers, or both storage tiers 115C and 115D may be cold tiers.

A logging application 120.1 of the applications 120 in the memory system 105 comprises instructions that, when executed, initiate a logging process and create a separate log the for each of the storage tiers 115. That is, every storage tier may have an associated log-file 121. The log files are stored in storage system 111. The storage system 111 is shown as part of the computer system 101 but may be part of a separate system connected to the computer system 101. In another example, the log files 121 may be stored depending on the characteristics of the associated storage tiers. For example, log file 121A for the storage tier 115A may be stored in a non-volatile memory of the memory system 105 as being more frequently accessed compared to the other log files while the log file 121D associated with the cold tier may be stored in the storage system 111.

In response to a change in data stored in at least one storage tier, e.g., 115A, one or more log records may be generated and written on the log file 121A. In FIG. 1, it is also shown a simplified structure of log file 121A. A field 131.1 of the log file 121A contains data indicative of the change caused by a given transaction. Field 131.2 contains a transaction ID of the transaction. A field 131.3 of the log file 121A contains a record linkage indicative of other storage tiers containing data that are changed by the same transaction. Field 131.4 contains a uniquely increased value of the global LSN. The log file further comprises a logical address (not shown) of the respective storage tier. For example, the log file 121A, 121B, 121C and 121D comprises a logical address of the storage tier 115A, 115B, 115C and 115D respectively.

The storage system 111 further comprises a mapping file 125 that is created for mapping between log files 121A-D and the storages tiers 115A-D. The mapping indicates for each log file 121A-D the respective storage tier 115A-D using the logical addresses.

The applications 120 further comprise a backup/restore policy manager 120.2 for managing restore and backup operations and for specifying the backup/restore policies in the context of the present method. Computer system 101 further comprises an API 127 between a user and the policy manager 120.2 that may allow the user to request for example a restore or backup operations of a storage tier 115. The term "user," as used herein, may refer to any entity (e.g., an individual, a computer, or an application executing on a computer) that issues restore or backup request to the system 100.

A full backup on a storage tier creates a full backup of everything stored on that storage tier. And a full backup command on the database level is translated to a full backup per storage tier.

Figure 2:
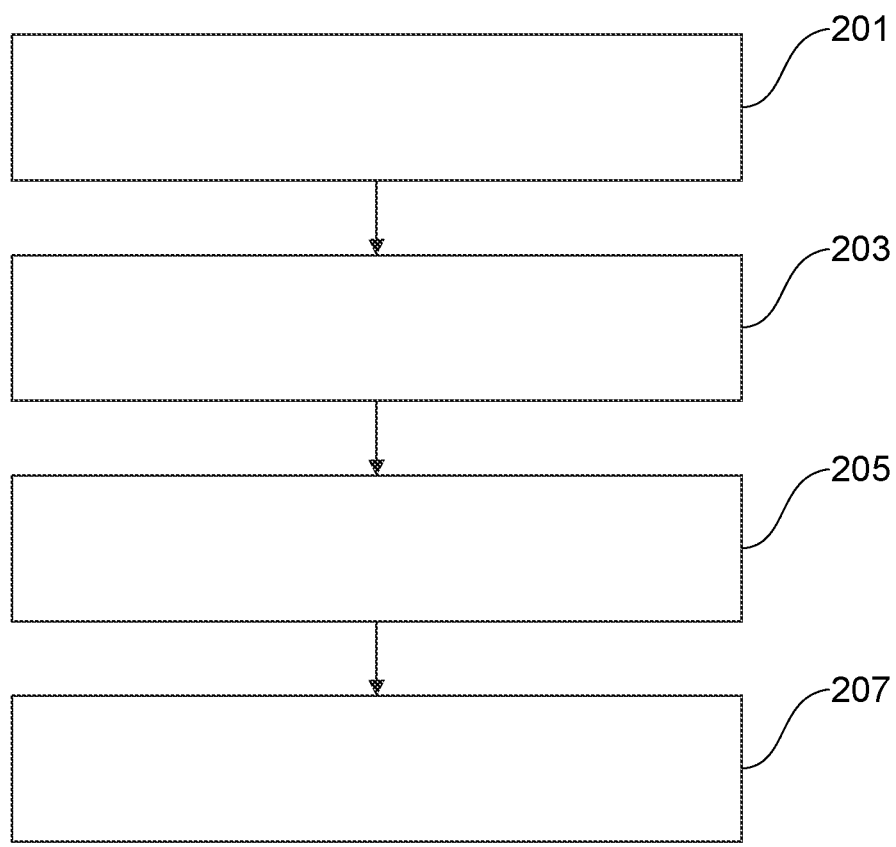
FIG. 2 is a flowchart of a method for restoring a storage tier.

FIG. 2 is a flowchart of a method for restoring a storage tier 115A-D at a given point in time. In step 201, the restore policy manager 120.2 may receive a request for restoring a storage tier, e.g., 115A, of the system 100. The request may be triggered, for example, after detection of a failure in the storage tier 115A such as an I/O error. The request may be received automatically from a detection component of the computer system 101 and/or from a user of the computer system 101. In step 203, the restore policy manager 120.2 may invoke the API 127, with the created mapping 125 to determine which one of the log files 121A-D is to be used to restore that storage tier 115A. In step 205, the restore policy manager 120.2 may read the log file 121A and use the LSN numbers written in the field 131.3 which are associated with each record of the log file 121A. And, to restore at the given point in time, the following is performed:

1. restoring the storage tier 115A to a state existing at a time point of an appropriate (e.g. a last) full back-up for that storage tier 115A.
2. applying either all incremental or delta backups taken up to the last one before the given point in time. In case of a split mirror full backup, this step may not be required.
3. rolling-forward the log file 121A on that storage tier 115A to the given point in time desired for the restoration.

If the restore is applied at the full database level on all storage 115A-D, the steps 1-3 may be applied concurrently across all storage tiers.

In step 207, the restore policy manager 120.2 may check for each read record in step 205 if the linkage field 131.4 comprises record linkage information for another storage tier. That is, the change associated with a record may affect other storage tier contents. For that, the restore policy manager 120.2 may read the record linkage information so as to determine whether other storage tiers are involved, and may perform the steps 201-207 for that determined storage tiers.

The usage a log file per storage tier may speed up the restore operation of the storage system compared to conventional methods.

Figure 3:
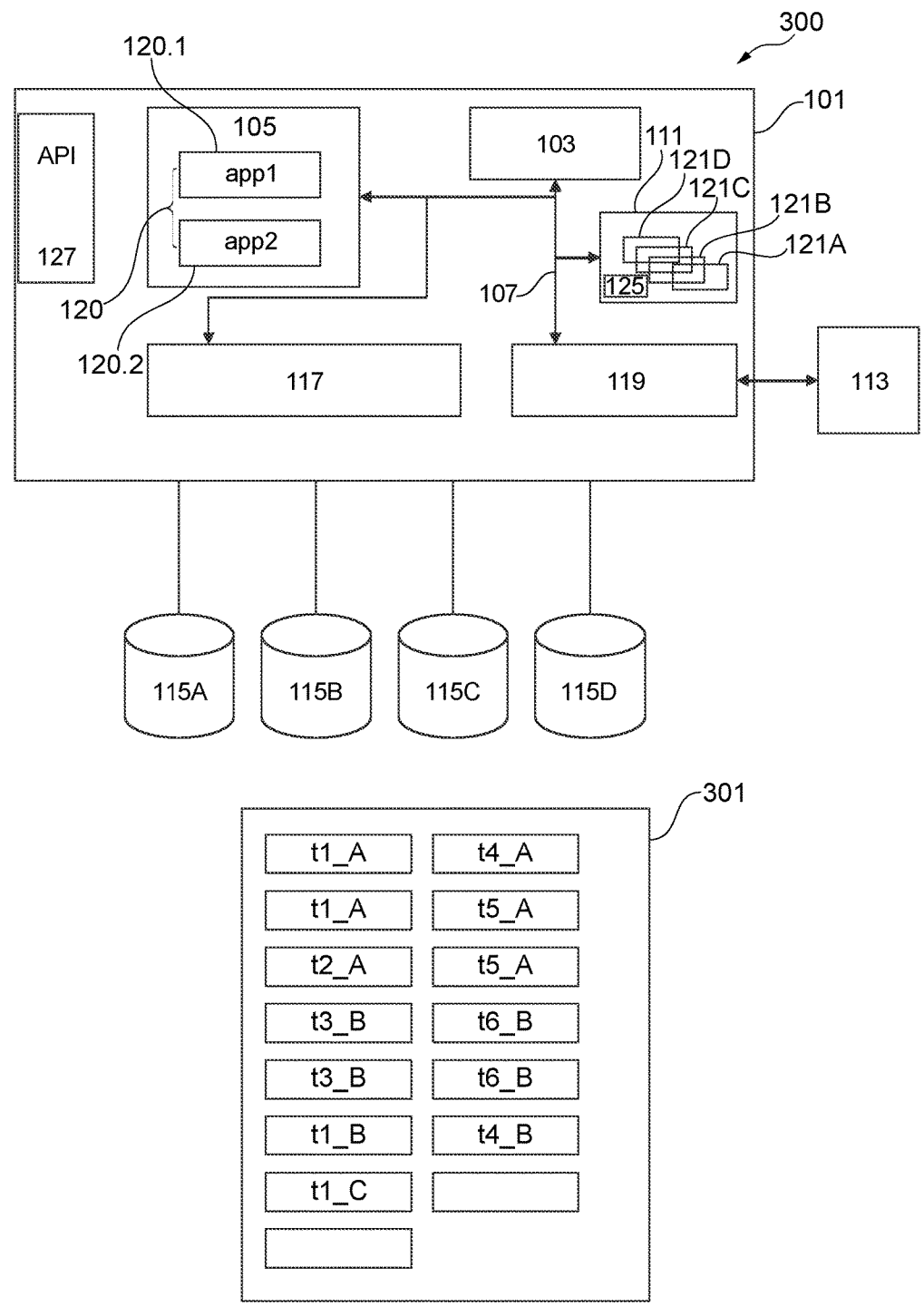
FIG. 3 depicts a further exemplary system architecture for a logging process.

FIG. 3 shows an exemplary system architecture 300 for a commit operation in accordance with the present method. The system architecture 300 is similar to the system architecture 100. In addition, a buffer pool 301 is associated with the storage tiers 115A-D and may be used by more than one table space. The buffer pool 301 may be a portion of system memory used to store pages of data read from/to be written to tables in a table-space. It may be part of the memory system 105. Though one buffer pool is shown multiple buffer pools may be used as well.

The buffer pool may comprise pages originating from different storage tiers 115A-D, and thus, may service one or more table spaces. In this case, the table space page size and the buffer pool page size are the same for all table spaces on the storage tiers 115A-D that the buffer pool 302 services.

Within the buffer pool 301 are two types of pages: modified pages which contain the transaction identifier like t1 and unmodified pages—which have been read but not modified which don't have an identifier.

t2_A, t3_B, t5_A and t6_B are modified pages which originate from a single storage tier 115A, 115B, 115A and 115B respectively. Each of the pages t2_A, t3_B, t5_A and t6_B is modified or updated by a respective transaction. This may be caused by transactions that act on individual storage tiers. However, in case of transactions which span across multiple storage tiers, modified pages such as t1_A, t1_B, t1_C, t4_A and t4_B may belong to different storage tiers but are modified or updated by the same transaction. For example, t1_A, t1_B and t1_C belong to the storage tiers 115A, 115B and 115C respectively, while t4_A and t4_B belong to the storage tiers 115A and 115B respectively.

In case a transaction includes changes on rows distributed across pages from multiple storage tiers, the commit operation of the transaction may be performed by writing all log records from pages in storage tier k into the transaction log file that belongs to storage tier k. For example, the log records from pages t1_A, t1_B and t1_C may be written in the log file of each of the storage tiers 115A, 115B and 115C. The log records from pages t4_A and t4_B may be written in the log file of each of the storage tiers 115A and 115B. This may happen asynchronously during transaction execution. On transaction commit, all transaction logs associated with storage tiers that are involved in the transaction need to be flushed to disk synchronously (force log at commit).

The invention claimed is:

1. A computer implemented method for a logging process in a data storage system comprising a set of storage tiers, each storage tier of the set of storage tiers having different performance characteristics, wherein the set of storage tiers is divided into a plurality of subsets of storage tiers using the performance characteristics, the method comprising:
   initiating, using a processor, the logging process for creating a separate log file for each of the plurality of subsets of storage tiers for maintaining a history of data changes in the subset of storage tiers, thereby creating a plurality of log files; and
   in response to a change in data stored in at least one storage tier of a subset of storage tiers of the plurality of subsets of storage tiers, generating, using the processor, one or more log records comprising information about the change, and writing, using the processor, the one or more log records into the respective log files, wherein
   each log file of the plurality of log files comprises a logical address of the respective subset of storage tiers, the method further comprising:
   creating a mapping between the plurality of log files and the plurality of subsets of storages tiers, wherein the mapping indicates for each log file of the plurality of log files the respective subset of storage tiers; and
   invoking an application programming interface with the created mapping to restore to a given time data content of a failed subset of storage tiers using the log file of the failed subset of storage tiers.

2. The method of claim 1, further comprising assigning a log sequence number to the plurality of subsets of storage tiers, wherein each log record of the plurality of log files comprises a uniquely increased value of the log sequence number.

3. The method of claim 2, further comprising recovering from a failure in a first and second subset of storage tiers of the plurality of subsets of storage tiers by restoring the first and second subset of storage tiers at a given time using the respective log file and log sequence number.

4. The method of claim 1, wherein in case the change in data stored in the at least one storage tier is caused by an operation that changes data stored in other storage tiers of the set of storage tiers, generating the one or more log records such that the information about the change is indicative of a record linkage of the at least one storage tier to the other storage tiers.

5. The method of claim 4, further comprising:
   in response to a restore request for restoring data content of a given subset of storage tiers of the plurality of subsets of storage tiers at a target point in time, using record linkages up to the target point in time in the log file of the given subset of storage tiers, to identify other subsets of storage tiers of the plurality of storage tiers to be restored; and
   restoring data content of the given storage tier and the identified subsets of storage tiers to the target point in time based on the log records of the respective log files and the log sequence number.

6. The method of claim 1, further comprising:
   performing a full backup of the storage system content by performing a full backup in each of the plurality of subsets of the storage tiers, and recording a log entry indicative of the full backup in the respective log file.

7. The method of claim 1, wherein the performance characteristics comprise one of an I/O response time, I/O throughput and a combination thereof, wherein dividing of the set of storage tiers comprises:
   ordering the storage tiers in accordance with at least one performance characteristic;
   defining a plurality of range constraints on the at least one performance characteristic; and
   selecting storage tiers from the set of the storage tiers satisfying the plurality of range constraints, for determining the plurality of subsets of storage tiers.

8. The method of claim 1, wherein each subset of storage tiers of the plurality of subsets of storage tiers comprises a single storage tier.

9. The method of claim 1, further comprising determining for a subset of the plurality of subsets of storage tiers the minimum log sequence number associated with the log records written in the log file of the subset of storage tier.

10. A computer program product comprising a non-transitory computer readable storage medium having computer executable instructions stored thereon, the computer executable instructions executable by a processor to perform a method for a logging process in a data storage system comprising a set of storage tiers, each storage tier of the set of storage tiers having different performance characteristics, wherein the set of storage tiers is divided into a plurality of subsets of storage tiers using the performance characteristics, the method comprising:
   initiating, using the processor, the logging process for creating a separate log file for each of the plurality of subsets of storage tiers for maintaining a history of data changes in the subset of storage tiers, thereby creating a plurality of log files; and
   in response to a change in data stored in at least one storage tier of a subset of storage tiers of the plurality of subsets of storage tiers, generating, using the processor, one or more log records comprising information about the change, and writing, using the processor, the one or more log records into the respective log files, wherein
   each log file of the plurality of log files comprises a logical address of the respective subset of storage tiers, wherein the method further comprises:
   creating a mapping between the plurality of log files and the plurality of subsets of storages tiers, wherein the mapping indicates for each log file of the plurality of log files the respective subset of storage tiers; and
   invoking an application programming interface with the created mapping to restore to a given time data content of a failed subset of storage tiers using the log file of the failed subset of storage tiers.

11. The computer program product of claim 10, further comprising assigning a log sequence number to the plurality of subsets of storage tiers, wherein each log record of the plurality of log files comprises a uniquely increased value of the log sequence number.

12. The computer program product of claim 11, the method further comprising recovering from a failure in a first and second subset of storage tiers of the plurality of subsets of storage tiers by restoring the first and second subset of storage tiers at a given time using the respective log file and log sequence number.

13. The computer program product of claim 10, wherein in case the change in data stored in the at least one storage tier is caused by an operation that changes data stored in other storage tiers of the set of storage tiers, generating the one or more log records such that the information about the change is indicative of a record linkage of the at least one storage tier to the other storage tiers.

14. The computer program product of claim 13, wherein the method further comprises:
   in response to a restore request for restoring data content of a given subset of storage tiers of the plurality of subsets of storage tiers at a target point in time, using record linkages up to the target point in time in the log file of the given subset of storage tiers, to identify other subsets of storage tiers of the plurality of storage tiers to be restored; and
   restoring data content of the given storage tier and the identified subsets of storage tiers to the target point in time based on the log records of the respective log files and the log sequence number.

15. The computer program product of claim 10, wherein the method further comprises:
   performing a full backup of the storage system content by performing a full backup in each of the plurality of subsets of the storage tiers, and recording a log entry indicative of the full backup in the respective log file.

16. The computer program product of claim 10, wherein the performance characteristics comprise one of an I/O response time, I/O throughput and a combination thereof, wherein dividing of the set of storage tiers comprises:
   ordering the storage tiers in accordance with at least one performance characteristic;
   defining a plurality of range constraints on the at least one performance characteristic; and
   selecting storage tiers from the set of the storage tiers satisfying the plurality of range constraints, for determining the plurality of subsets of storage tiers.

17. The computer program product of claim 10, wherein each subset of storage tiers of the plurality of subsets of storage tiers comprises a single storage tier.

18. The computer program product of claim 10, wherein the method further comprises determining for a subset of the plurality of subsets of storage tiers the minimum log sequence number associated with the log records written in the log file of the subset of storage tier.

19. A computer system for a logging process in a data storage system comprising a set of storage tiers, each storage tier of the set of storage tiers having different performance characteristics, wherein the set of storage tiers is divided into a plurality of subsets of storage tiers using the performance characteristics, the computer system comprising a processor, and memory configured to store a plurality of applications that are executable on the processor, wherein a logging application of the applications includes instructions that, when executed cause the processor to perform a method comprising:
   initiating the logging process for creating a separate log file for each of the plurality of subsets of storage tiers for maintaining a history of data changes in the subset of storage tiers, thereby creating a plurality of log files; and
   in response to a change in data stored in at least one storage tier of a subset of storage tiers of the plurality of subsets of storage tiers, generating one or more log records comprising information about the change, and writing the one or more log records into the respective log files, wherein
   each log file of the plurality of log files comprises a logical address of the respective subset of storage tiers, wherein the method further comprises:
   creating a mapping between the plurality of log files and the plurality of subsets of storages tiers, wherein the mapping indicates for each log file of the plurality of log files the respective subset of storage tiers; and
   invoking an application programming interface with the created mapping to restore to a given time data content of a failed subset of storage tiers using the log file of the failed subset of storage tiers.

20. The computer system of claim 19, wherein the method further comprises assigning a log sequence number to the plurality of subsets of storage tiers, wherein each log record of the plurality of log files comprises a uniquely increased value of the log sequence number.

21. The computer system of claim 19, wherein in case the change in data stored in the at least one storage tier is caused by an operation that changes data stored in other storage tiers of the set of storage tiers, generating the one or more log records such that the information about the change is indicative of a record linkage of the at least one storage tier to the other storage tiers.

22. The computer system of claim 19, wherein the method further comprises:
   performing a full backup of the storage system content by performing a full backup in each of the plurality of subsets of the storage tiers, and recording a log entry indicative of the full backup in the respective log file.

* * * * *